United States Patent [19]

Pargee, Jr.

[11] Patent Number: 4,577,191
[45] Date of Patent: Mar. 18, 1986

[54] MATRIX CONTROL METHOD AND APPARATUS

[75] Inventor: Robert W. Pargee, Jr., San Clemente, Calif.

[73] Assignee: EECO Incorporated, Santa Ana, Calif.

[21] Appl. No.: 524,435

[22] PCT Filed: Aug. 1, 1983

[86] PCT No.: PCT/US83/01167
§ 371 Date: Aug. 1, 1983
§ 102(e) Date: Aug. 1, 1983

[87] PCT Pub. No.: WO85/00720
PCT Pub. Date: Feb. 14, 1985

[51] Int. Cl.$^4$ .............................. H04Q 9/00
[52] U.S. Cl. .................. 340/825.79; 340/825.52; 340/825.36; 340/332; 340/311.1
[58] Field of Search .............. 340/825.79, 825.52, 340/332, 311.1, 825.36

[56] References Cited

U.S. PATENT DOCUMENTS

| | | | |
|---|---|---|---|
| 3,585,595 | 6/1971 | Slavin et al. | 340/825.05 |
| 3,795,771 | 3/1974 | Gundersen et al. | |
| 4,016,369 | 4/1977 | Pedersen | 340/825.52 |
| 4,253,087 | 2/1981 | Saal | 340/825.52 |
| 4,425,564 | 1/1984 | Steele | 340/825.79 |

Primary Examiner—Donald J. Yusko
Attorney, Agent, or Firm—Harry R. Lubcke

[57] ABSTRACT

A method and an apparatus for controlling a selected electrical use circuit (9) from among a multiplicity thereof from a correspondingly selected electrical control circuit (8) from among the same multiplicity thereof. Two pulse operating plural-phase clocks (A & B) have mutually prime factors for the number of phases of each, such as five and six. These feed clock pulses (10,+) to each of the use and the control circuits. In each use and each control circuit all phases of the clocks are shifted one phase. One control circuit thereby uniquely actuates only one use circuit. Plural separate functions can be selectively energized at any use circuit.

12 Claims, 6 Drawing Figures

MATRIX CONTROL METHOD AND APPARATUS

TECHNICAL FIELD

This invention pertains to the corresponding electrical control of a plurality of use circuits selectively accomplished from amongst a plurality of control circuits.

BACKGROUND ART

The prior art has accomplished such control by a system of time multiplex, or in a fragmentary way by a scheme of self-assigning address.

The U.S. Pat. No. 3,795,771, of Mar. 5, 1974 to J. Gundersen et al is one example of multiplexing; the example given therein pertaining to attendant service and entertainment for each passenger in a large jet aircraft.

MOS-FET integrated circuit chips are employed and the circuitry includes numerous counters, flip-flops, shift registers, and AND, NAND and NOR gates.

The U.S. Pat. No. 3,585,595, of June 15, 1971 to M. Slavin et al is another example, having a closed loop with series-connected coders. In a sequence, coders and decoders are sequentially activated to perform their assigned functions. Thereafter, each activated coder and decoder assumes an inactive state, in which they permit the passage of control signals and data therethrough. The control signals can be applied in either direction along the series connections.

The U.S. Pat. No. 4,253,087, of Feb. 24, 1981, to H. Saal is an example of self-assigning address. However, it discloses an address system only, having one series of addressable units connected to one control unit. Use circuits are not disclosed at all. Each addressable unit has a signaling device, such as an electronic circuit, which operates in the same manner at each addressable unit location by permuting signals appearing on the input connector.

The control unit emits several "signals" in two prime-related groups. The simultaneous appearance of these several signals at only one device accomplishes the addressing. The nature of, and the waveshapes of, the signals are not disclosed.

SUMMARY OF THE INVENTION

A unique combination of typically two pulse multiphase clocks forms a control matrix. The number of phases in each clock is different and mutually prime; i.e., 5 for one clock and 6 for the other. In use, this matrix will service 30 stations, seat groups, in application to passenger aircraft.

At each passenger seat there is a coder, control circuit, to accept the passenger command, and at a corresponding overhead location there is a decoder, use circuit, to accomplish the command; such as to turn on a reading light. In the interconnecting wiring each of the 11 clock line conductors is shifted one phase at each corresponding location.

A simple 2-input AND gate is present at each station and is used to extract the unique matrix position for each station. All passenger seat boxes, coders and seat cables are alike. All corresponding overhead decoders and overhead cables are alike. This simplifies maintenance. However, the matrix of phases and wiring is such that a given coder controls only the corresponding decoder.

Each coder and decoder is essentially only a pair of diodes. The whole system is thus simplified with respect to the multiplex control art and complete with respect to the fragmentary addressing art.

BEST MODE FOR CARYING OUT THE INVENTION

A typical use for the matrix control and use circuits of this invention is within a wide-bodied aircraft, where the ceiling is too high for a passenger to reach up and actuate a reading light switch located on the overhead ceiling. This is an important application, but the applicability to other vehicles and to stationary installations will become apparent upon the conclusion of this description.

Figure 1:
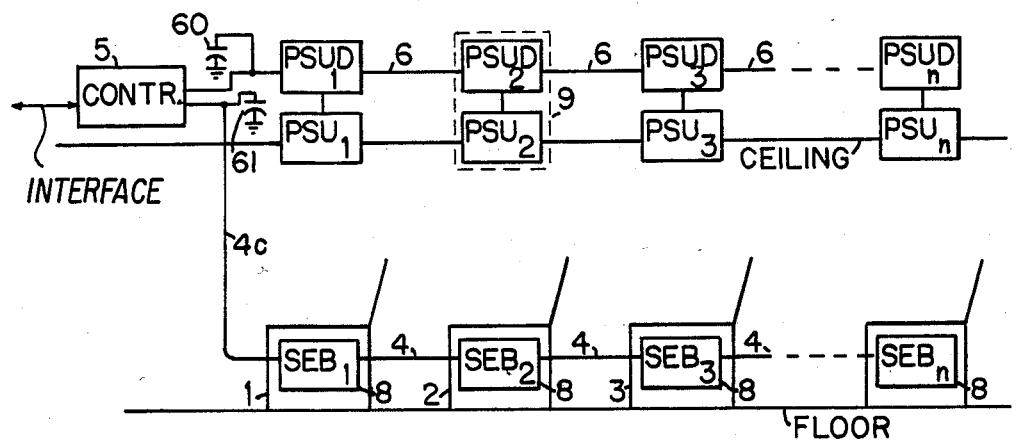
FIG. 1 is a block diagram of the apparatus, as installed in a vehicle, such as a passenger aircraft.

FIG. 1 shows a schematic block diagram of the matrix apparatus, taken in side sectional elevation insofar as the placement of the elements in an aircraft is concerned. Typically, the front of the aircraft is at the left. Seats 1, 2, 3, - - n are simply illustrated. Each of these represents a seat group of one, two or three, aligned.

Each group has a seat electronics box, SEB 1, SEB 2, SEB 3, - - - SEB n. Individual passenger controls are provided for each SEB, as detailed in FIG. 3. These are suited to activate separate use units, as detailed in FIG. 4.

In the illustrative example of the first plural-phase clock having five phases and the second plural-phase clock having six phases, unique pulse relationships occur to a total of thirty relationships. Thereafter the phases return to the original relationship and the process repeats, on and on.

In this example n=30, and there are 30 SEB boxes, 8, as a maximum. A seat to seat cable 4 connects between each SEB box. This cable has 5+6=11 wires for the five and six phase clocks. Additionally, there are 6 more wires to provide for 5 function signals and a voltage supply. These handle reading lights 1, 2, 3, attendant call, and call cancel functions. A total of 17 wires thus comprise cable 4c.

The column wiring 4c takes the circuits from the floor of the vehicle to above the ceiling of the passenger compartment to the overhead area. This area contains section controller 5, the use circuits 9, etc.

If there are three seats in a row to each seat group, then a total of ninety seats are served by the one column facet of the system that is illustrated in FIG. 1. A large aircraft may have four or more columns of service in a zone.

Figure 6:
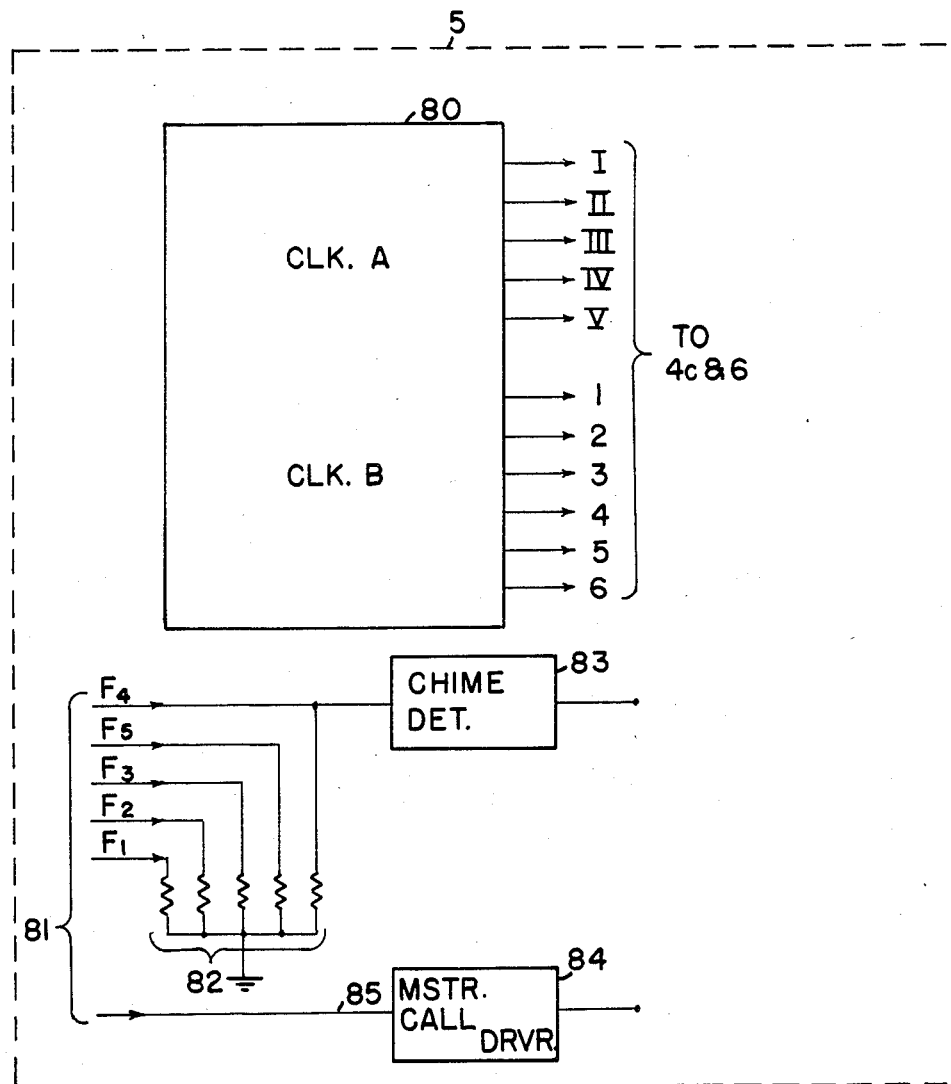
FIG. 6 is a block diagram for the section controller.

The section controller 5 of FIG. 6 contains plural, typically two, plural-phase clocks A and B, an interface (connections to) the power supply of the aircraft, and connections to other optional fitments, such as an electrical chime signal, provision for master call, the attendant's signal light panel, and a self-test panel.

The physical placement of the several elements of the apparatus is optional, but section controller 5 is normally located in the overhead area directly above the column through which cable 4c is run.

A connection of all of the plural phases from each of clocks A and B is made to cable 4c and also to overhead cable 6. Cables 4 and 6 pass backward in the aircraft, giving a "U" lying horizontally configuration to the system. Each of the use units are in each case typically directly above the corresponding SEB seat unit.

In this illustrative embodiment the use circuits are composed of two units, a passenger service unit decoder, "PSUD", and a closely adjacent passenger service unit, "PSU"; together comprising entity 9.

The PSU unit contains the reading lights and a call light. The latter is a call signal to the attendant (stewardess) that some item of service is wanted and the illuminated call light gives the row of seats in which the passenger calling is located.

Typically, the PSU unit is mounted in the ceiling of the aircraft and is at least visible at the bottom part to the passengers, so that the lights may shine upon them for reading, etc. The PSUD unit is mounted above the PSU unit and is not visible to the passengers.

Figure 2:
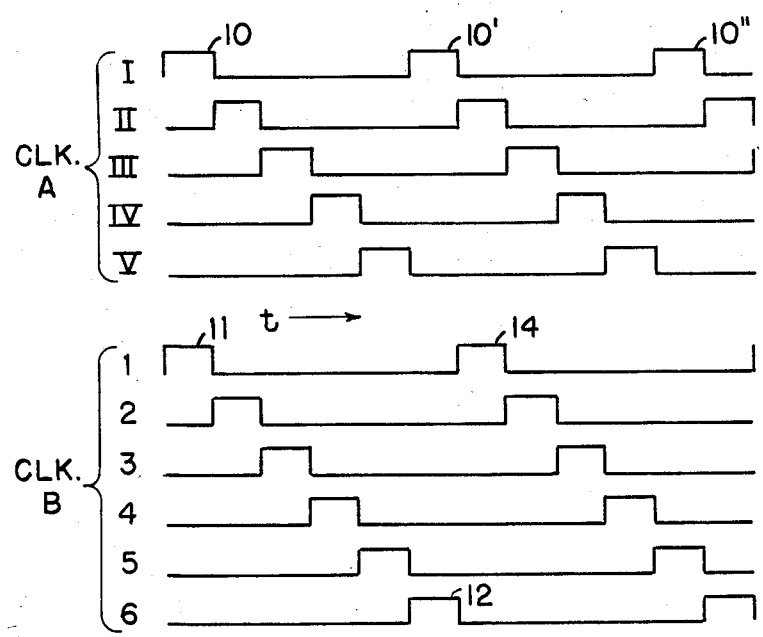
FIG. 2 shows the plural phase pulse waveforms for each of the two plural-phase clocks.

FIG. 2 shows the pulse waveforms for all phases of both clocks A and B. The pulse amplitude is the ordinate and time, t, is the abscissa. The time scale is the same for all pulses. Thus, vertical coincidence of the pulses in the figure corresponds to coincidence in time. The duration of each pulse may typically be 1/400th second, although other time durations are practical, within the range of from 1/10,000 sec. to 1/10th second.

The first pulse 10 of phase I of clock A and the first pulse 11 of phase 1 of clock B are in time coincidence. The wiring internally of the first seat units, SEB 1 and PSUD 1 may be arranged so that when pulses 10 and 11 are in coincidence the PSUD unit is activated if the SEB unit has been actuated by the passenger in that seat by pressing a button.

In a similar manner the second phase pulses of both clocks A and B are in time coincidence. The second phase pulses occur just after the first phase pulses in this typical embodiment. Further, the third phase pulses are in coincidence, and occur just after the second phase pulses. The same is true for phases four and five.

However, when phase I of clock A repeats with its pulse 10' this is in time coincidence with phase six, pulse 12 of clock B rather than being coincident with phase 1 pulse 14 of clock B. This is because the two clocks have a mutually prime number of phases. This situation may also be stated as—"not having a common multiple".

This first repeat thus begets a new combination of pulses, unique with respect to the first sequence. Phase II of clock A is coincident with phase 1 of clock B, phase III of A with phase 2 of B, phase IV of A with phase 3 of B, phase V of A with phase 4 of B, phase I (pulse 10") of clock A is coincident with phase 5 of clock B, and phase II of clock A is coincident with phase 6 of clock B.

It is seen that on each complete cycle of clock A pulses that clock B falls one phase behind the relation that obtained on the prior cycle. It is not until 5×6=30 pulse coincidences have occurred that phase I of clock A is coincident with phase 1 of clock B, and then the whole sequence starts over again.

Thus, if each SEB and its corresponding PSUD is made responsive to just one combination of clock A and clock B phases there will be one unique coincidence for each of the thirty seat groups postulated, and individual control can be exercised out of an otherwise common matrix.

The matrix is set forth in Table I.

The five phases of clock A are positioned in a horizontal row at the top of the table and the six phases of clock B are positioned in a vertical column at the left of the table.

The succession, or what may be termed phase rotation, occurs along diagonal lines in the table.

For instance, in the upper left-hand corner, phase one of each of the clocks is available for actuation of the PSUD 1 decoder in the overhead upon a passenger depressing a push-button at corresponding SEB 1 box.

Next diagonally down to the right both phases 2 are available for the actuation of group 2. Similarly, for phases and groups 3, 4 and 5.

Phase I of clock A and phase 6 of clock B are available for group 6.

TABLE I

| | CLOCK A | | | | |
|---|---|---|---|---|---|
| CLOCK B | PHASE I | PHASE II | PHASE III | PHASE IV | PHASE V |
| PHASE 1 | GROUP 1 | GROUP 7 | GROUP 13 | GROUP 19 | GROUP 25 |
| PHASE 2 | GROUP 26 | GROUP 2 | GROUP 8 | GROUP 14 | GROUP 20 |
| PHASE 3 | GROUP 21 | GROUP 27 | GROUP 3 | GROUP 9 | GROUP 15 |
| PHASE 4 | GROUP 16 | GROUP 22 | GROUP 28 | GROUP 4 | GROUP 10 |
| PHASE 5 | GROUP 11 | GROUP 17 | GROUP 23 | GROUP 29 | GROUP 5 |
| PHASE 6 | GROUP 6 | GROUP 12 | GROUP 18 | GROUP 24 | GROUP 30 |

Phase II of clock A and phase 1 of clock B are available for actuation of group 7, and diagonally down to the right the phases to actuate groups 8, 9 and 10 are specified.

The diagonal down to the right succession continues as set forth in the table until group 30 is finally available for actuation in the lower right position of the table.

Should fewer seat groups, or the equivalent, to be controlled be the situation in an alternate embodiment, a different plural phase combination can be used. For example, for 20 seat groups the plural phase clocks may have 4 and 5 phases, respectively. This requires two wires less on all of the cables; a saving in weight.

Should 42 seat groups be required, the plural phases may be 6 and 7. Two more wires are required than the 11 wires of the 5 and 6 combination.

Figure 3:
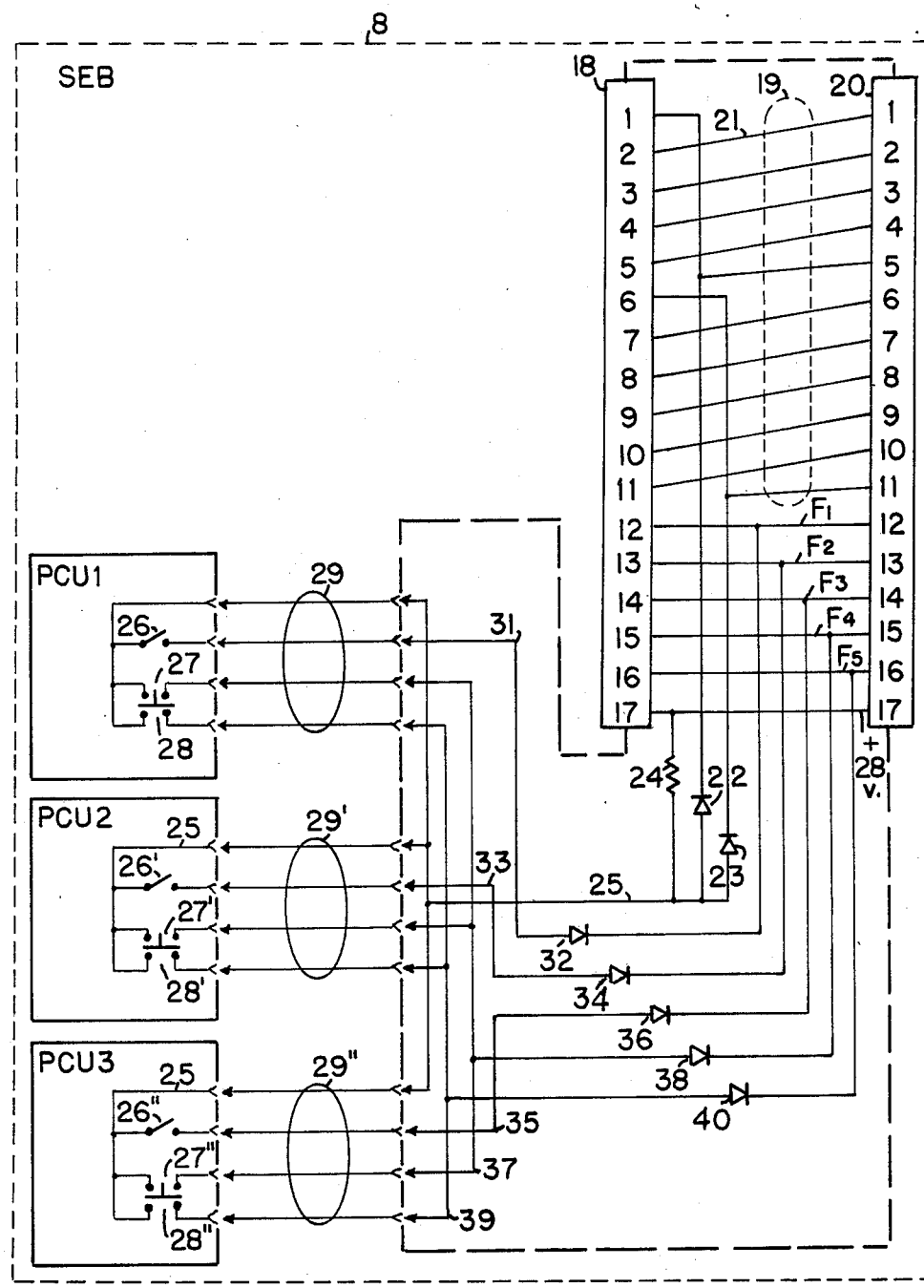
FIG. 3 is the schematic wiring diagram for an electrical control unit, including the input to output phase-to-phase wiring.

In FIG. 3 the wiring associated with the seat-to-seat cable input connector and the seat-to-seat cable output connector is discussed first because of the significance of this wiring with respect to the matrix.

Insofar as the clock phases are concerned, input connector 18 has terminals 1 through 5 that are connected to an incoming cable 4 that brings in phases I through V from clock A; also terminals 6 through 11 that brings in phases 1 through 6 from clock B. Cable 4 typically has conductors 12 through 17 that carry function control pulses, to be discussed later.

Cable 4, in all of its sections between the several seats, is uniform in the connectors attached thereto and in the conductors of the cable that are attached to the connectors. That is, terminal 1 of the first cable connector, conductor 1 of the cable, and terminal 1 of the second cable connector in the run between two seats are the same for all cables between all seats. The same arrangement occurs for terminals and conductor 2, for terminals and conductor 3, and so on, for the 17 terminals.

The advancement of the phases of the two clocks occurs in connections generally indicated by the dotted surround 19 in FIG. 3, as connected between input connector 18 and seat-to-seat output connector 20. Typically, terminal 2 of input connector 18, which carries phase II of clock A, is connected by conductor 21 to terminal 1 of output connector 20. This, then, advances the phase for the next SEB for the next seat. The same configuration applies for phase III of clock A, incoming at terminal 3 of connector 18 and advancing to terminal 2 of output connector 20. The same is also true for incoming phase IV and for phase V. Phase I of clock A, on incoming terminal 1, not having a terminal "0" on the outgoing, is connected to terminal 5 on outgoing connector 20.

Clock B is connected in the same manner as clock A. That is, terminal 7 of input connector 18, which carries phase 2 of clock B, is connected to terminal 6 of output connector 20. The same configuration applies to phases 3 through 6; i.e., terminals 8 through 11 at the input, and terminals 7 through 10 at the output. As before, phase 1 of clock B, at incoming terminal 6, is connected to terminal 11 of outgoing connector 20.

Recapitulating, each interconnecting cable 4 is identical and each SEB box is the same as just recited. Thus, each phase of both clocks advances one phase at each successive SEB box until the end of the column series; seat 30, in the present example.

The combination of the waveform phase relations of the plural phases of both clocks of FIG. 2, and the advance by wiring at each SEB box, as shown in FIG. 3, provides an individual (unique) pulse-time coincidence for each SEB box. Since the plural phases follow successively in time, there is an individual time period, one pulse long, during which a command entered into the SEB box by the passenger can be transmitted over the common cable connections of cables 4 and 6 to actuate the corresponding PSUD decoder, and so turn on the reading light thereof, as an example.

It is stated in connection with FIG. 3, herein, that a second opportunity for the command to be entered occurs 75 milliseconds later than the first opportunity. Since any human activity, such as pressing a pushbutton, consumes more time than 75 milliseconds the command is sure to be executed by the apparatus.

Further in FIG. 3, in order that the matrix be connected to passenger control pushbutton circuits, connector 18 terminal 1 is connected to the cathode of diode 22. Also, terminal 6 thereof is connected to the cathode of diode 23. The several diodes used are of the signal type, capable of conducting several milliamperes and having a voltage rating of nominally 75 volts.

Typically, the electric power used to energize the matrix system is 28 volts DC, such as is available in aircraft. The diodes are thus capable of functioning reliably, and will withstand voltage transients, if any.

Resistor 24 is connected from the positive polarity 28 volt power conductor that is connected between incoming and outgoing connector terminals 17 to the anodes of both diodes 22 and 23. These three elements comprise an AND gate. A pulse output occurs on unique clock pulse conductor 25, which is connected to the anodes of diodes 22 and 23. Thus, depending upon the relative position of this connector wiring in the whole matrix, whatever phase of clocks A and B is present upon terminals 1 and 6, the time of coincidence of the pulses of these phases gives an output. Conductor 25 is connected to the passenger control unit that is provided for each passenger of the group. This unit is typically positioned in the arm of the passenger seat, or at an equivalent convenient location.

In FIG. 3, three passenger control units are shown; PCU#1, PCU#2 and PCU#3. All are the same, and have a single-pole single-throw low current switch 26 for turning "on" or "off" the reading light aimed to illuminate that seat area for reading. Also, a "call" momentary contact switch 27 for energizing a light overhead to call the attendant, and a "cancel" switch 28, normally actuated by the attendant when that person arrives. This is a three position, normally open, momentary contact switch.

Conductor 25 connects at the left of each of these PCU units to one terminal of each of the recited switches. A cable, generically represented as 29, 29' and 29", connects the required conductors from the SEB mechanical structure to the PCU units. These connections are normally made by means of connectors, which are shown in FIG. 3 as double arrowheads.

Assume that reading light switch 26 of PCU#1 is closed by the passenger. This delivers a succession of unique clock pulses via conductor 31 to unilateral conductor (diode) 32, which is the diode employed for isolation of the circuit from the matrix until meaningful pulses are to be delivered. The cathode of the diode is connected to the conductor that connects from input connector 18 terminal 12 to output terminal 12 of connector 20, and is denoted "F1". Note that this connection carries straight through and does *not* advance a phase as was the case for terminals 1 through 11 on input connector 18. The "F1" designation indicates "function 1", namely, "turn on the reading lamp for seat #1" in the seat group involved. In the same way, closing reading light switch 26' in PCU#2 returns unique clock pulses via conductor 33 and diode 34, thence to the conductor that passes from terminals 13 to 13, and has the designation "F2". Still further, closing switch 26" in PCU#3 returns unique pulses via conductor 35, diode 36, and to the "F3" conductor at terminal 14.

All of the "call" switches 27, 27' and 27", have a common return conductor 37, which connects to diode 38, and to the "F4" conductor at terminal 15. This is the usual aircraft arrangement in which there is only one "call" light for a group of three seats. The attendant arrives at the group of seats and by personal contact determines which one of the three passengers desires service.

Similarly, all of the "cancel" switches 28, 28' and 28" have common return conductor 39, which connects to diode 40 and to the "F5" conductor at terminals 16. Upon arrival at the seat group the attendant normally operates this switch, thereby extinguishing the "call" light and preparing the system for subsequent calls.

Recapitulating, the two terminal AND gate 22, 23, 24 detects the coincidence of the clock A and clock B pulses derived from terminals 1 and 6 of connector 18. Because of the wiring rotation scheme that has been described above, each seat group has a unique combination, and the output of the AND gate is a pulse associated with the matrix position applicable to that seat group only.

Each seat group encodes commands onto five function conductors for the unique matrix position allocated to the group. The five lines provide for 32 possible binary states. A table of state assignments is given in Table II.

The simple AND gate shown is used to maximize reliability of the system through simplicity. It may be replaced by a TTL (Transistor-Transistor-Logic) gate, a CMOS (Complementary-Metal-Oxide-Semiconductor) logic gate, or other forms of logic for accomplishing the same purpose.

Figure 4:
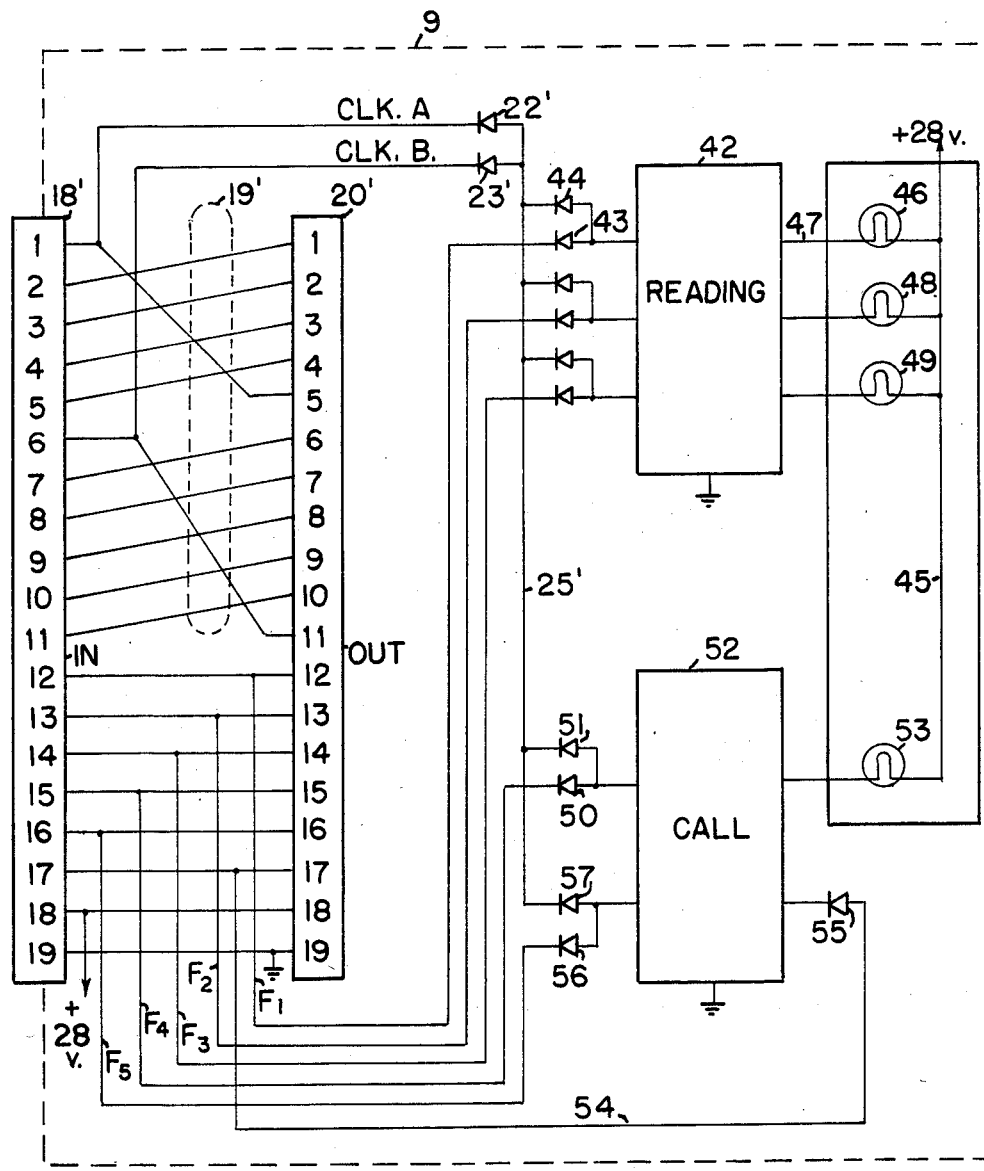
FIG. 4 is a schematic and block wiring diagram for an electrical use unit.

FIG. 4 is the schematic and block diagram for an electrical use unit 9 according to the illustrative example being considered; the PSUD and the PSU units of FIG. 1.

The input connector 18', the output connector 20' and the wiring 19' between the two connectors is the same for each PSUD decoder, and the same as the corresponding elements having non-primed reference numerals in FIG. 3.

In a corresponding manner in which the clocks were connected and the function conductors were connected in FIG. 3, they are connected in FIG. 4.

To repeat, all of the inter-unit cables 4 and 6 are the same and all of the input to output connectors in both FIGS. 3 and 4 are the same.

Electric power for energizing the reading lamps is supplied to each from conductor 45 in FIG. 4. This may be full wave rectified 400 Hertz power, at 28 volts.

When the F1 switch is closed, power from conductor 45 is passed on through reading lamp #1, element 46 in the PSU block via conductor 47 and through the switch to complete the circuit for lighting this lamp.

In the same manner, pulses from unique conductor 25' and the F2 function conductor causes reading lamp #2, element 48, to be lit due to switch 26' being closed by that passenger. Still further in the same manner, pulses from unique conductor 25' and the F3 function conductor causes reading lamp #3, element 49, to be lit due to switch 26" being closed by that passenger.

Figure 5:
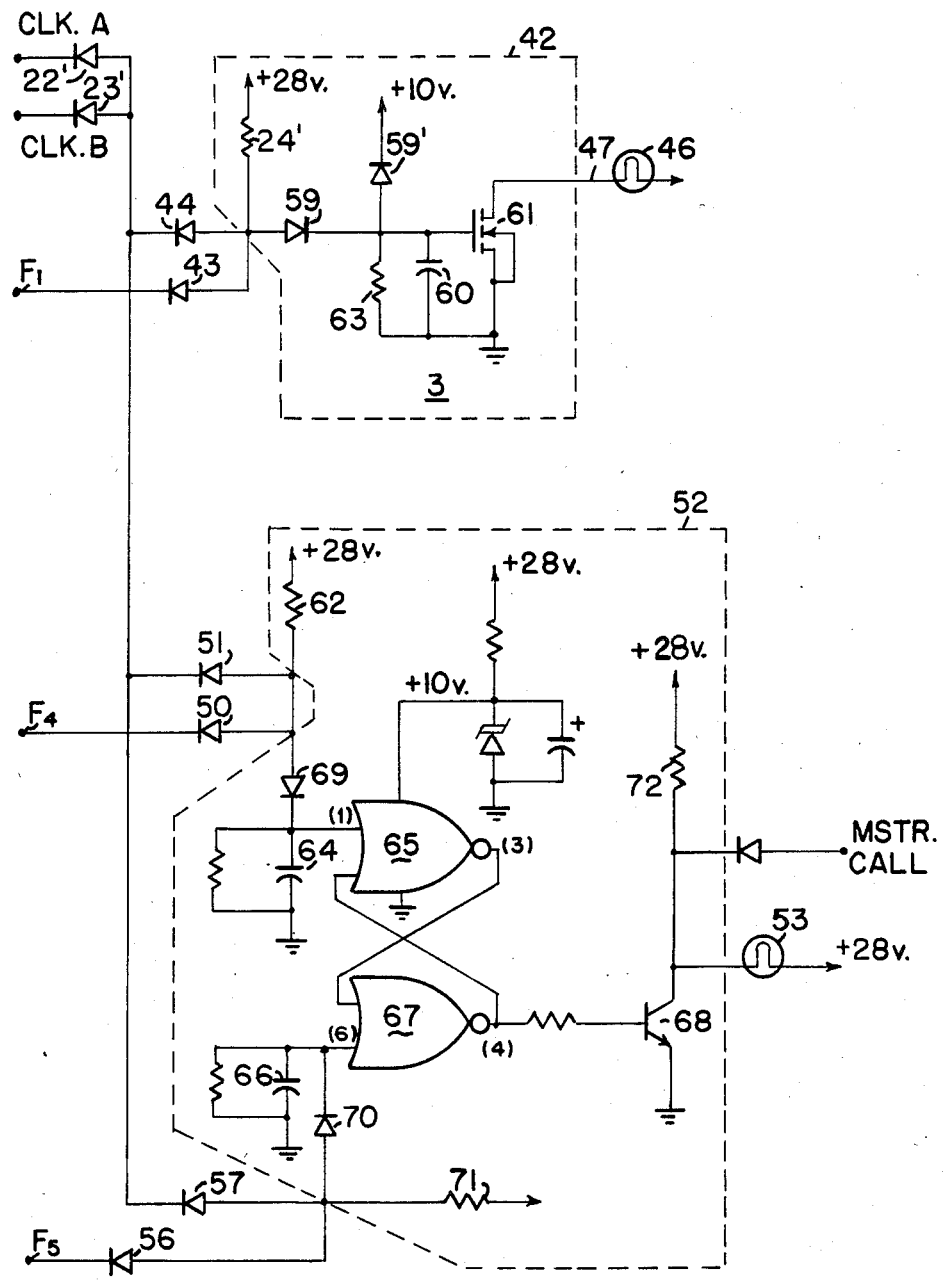
FIG. 5 is a schematic wiring diagram for lamp driver and call memory circuits.

Reading lamp drivers 42 of FIG. 4 is detailed for one reading lamp within the dotted surround labeled 42 in the upper portion of FIG. 5. This circuitry is merely repeated for the additional lamps 48 and 49.

Diode 22', introducing the pulses of clock A, diode 23', introducing the pulses of clock B, diode 44 introducing both of the same to driver 42, and diode 43, introducing function conductor F1 to the driver, have all been shown in FIG. 4 and described in connection therewith. These elements are duplicated in FIG. 5 for convenience in comprehending the circuit functioning.

Diodes 44 and 43, in combination with resistor 24', the latter being shown within the driver surround 42, comprise an AND gate. The output junction thereof goes "hi" only when there is a combination of pulses

TABLE II

| LINE 1 | LINE 2 | LINE 3 | LINE 4 | LINE 5 | FUNCTION ASSIGNMENT |
|---|---|---|---|---|---|
| 0 | 0 | 0 | 0 | 0 | NO CHANGE |
| 1 | X | X | X | X | READING LAMP #1 "ON" |
| X | 1 | X | X | X | READING LAMP #2 "ON" |
| X | X | 1 | X | X | READING LAMP #3 "ON" |
| X | X | X | 1 | 0 | CALL |
| X | X | X | 0 | 1 | CANCEL |
| X | X | X | 1 | 1 | UNASSIGNED |

LEGEND:
PULSE = 1
NO PULSE = 0
EITHER = X

In FIG. 4, clock A conductor includes diode 22' and clock B conductor includes diode 23'. These are connected together on the anode side and to the unique clock pulse conductor 25' for this decoder. An equivalent AND gate resistor 24' is to be found within the reading lamp drivers block 42 for the clock diodes and others to be described below.

Function conductor F1 is connected from connector terminal 12 of FIG. 3 and includes diode 43, the cathode thereof being connected to the terminal; also diode 44, being connected with cathode to the unique pulse conductor 25'.

Diodes 43 and 44, with resistor 24', comprise an AND gate that requires that an output pulse due to the clocks be present on conductor 25', and also that a pulse be simultaneously present on function conductor F1 due to switch 26 being closed by the passenger at PCU#1. Then an actuating pulse is passed on into the reading lamp drivers, block 42. These diodes are signal type diodes, as before.

The reading lamp drivers, block 42, contains a transistorized switch for each of function conductors F1, F2 and F3, each of which switch may be as shown in FIG. 5.

from both clocks A and B and a pulse from function conductor as well.

Through diode 59, this charges capacitor 60 to a peak voltage. This may be 10 volts, and the capacitor may have a capacitance of 0.1 microfarad (mfd).

After the coincidence of the pulses has ceased the output junction goes "low". However, diode 59 isolates capacitor 60 from this downward voltage excursion and the charge largely remains on the capacitor.

Resistor 63 is connected in shunt to capacitor 60 to give a controlled rate of decay of the charge on the capacitor. The resistor may have a resistance of 2.2 megohms, which gives a reduction of the voltage on the capacitor from 10 to 7 volts during a 75 millisecond interval between charging pulses. This typical interval results from a dwell of 2½ milliseconds (=1/400 second) on each of 30 seat groups.

Power field-effect transistor 61 is connected to capacitor 60 for control by the charge thereon. The voltage excursion from 10 to 7 volts is arranged to retain the FET in the "on" condition. This transistor, which may be a IRF21 type, remains completely "On" with a 5 volt or greater signal, and is turned completely "Off" by a 2 volt or lower signal. Diode 59' is connected from the capacitor to a +10 volt supply and is a protection diode, so that the voltage at the gate of FET 61 shall never exceed 10 volts. The output of the FET is the drain, which is connected to lamp 46, the use element. The FET will conduct several amperes for a fraction of a second when the lamp is first turned on, but the current decreases to 0.8 ampere when the lamp is hot. As seen in FIG. 4, the lamp circuit is completed through conductor 45 to typically a 28 volt DC supply.

The call memory and chime pulse entity 52 of FIG. 4 is detailed within the dotted surround labeled 52 in the lower portion of FIG. 5. This circuit energizes call lamp 53 of FIGS. 4 and 5.

The pulses of clocks A and B are introduced to call entity 52 by diode 51. The pulse of function line F4 is introduced by diode 50, this being the call circuit for typically a row of three seats in an aircraft, to which a stewardess responds. As before, an AND gate is formed, and when all pulses are simultaneously present the output at resistor 62 goes "hi". This charges capacitor 64, which may have a capacitance of 0.01 mfd.

Cross-coupled NOR gates 65 and 67 constitute a flip-flop latch. Only a momentary charge is required on capacitor 64 to give a "hi" input on pin (1) of gate 65, such that the output at pin (3) goes "low". It is assumed for the moment that there is not a "cancel" pulse on function conductor F5, and pin (6) is not "hi" as a consequence. The output at pin (3) thus remains "low", pin (4) switches "hi" and transistor 68 is turned "On". This provides a conductive path through call lamp 53 and conductor 45 to a 28 volt power supply as seen in FIG. 4.

The NOR gates may be a part of an integrated circuit CD4001B, and the transistor may be a type 2N2222.

The "cancel" function conductor F5 provides a pulse to the circuit comprised of diodes 56 and 70, capacitor 66, resistor 71, and clock input diode 57. This is a mirrorimage of the capacitor 64 circuit that has been described. The cancel function provides a "low" at pin (4), thus causing transistor 68 to cease conducting and lamp 53 to be deenergized. Resistor 72, which may have a resistance of 150K ohms, is connected to the collector of transistor 68 to provide a "pull-up" for this circuit should lamp 53 be burned out.

FIG. 6 details section controller 5 of FIG. 1.

Multi-phase clock generator 80, therein, contains clock A having plural phase outputs I through V, and also clock B having phases 1 through 6. The generator includes two flip-flop counters, which each may be an RCA CD4022B integrated circuit. One is wired to count by five to provide clock A while the other is wired to count by six to provide clock B. Associated with those two counters in a CD4001B integrated circuit, one circuit each of which is utilized to determine that the reset function reliably occurs for each of the counters.

Further, a 400 Hertz oscillator is composed of three inverters of an RCA CD4069UB integrated circuit. The output is a square-wave. This clocks one of the flip-flop counters to divide that output by five and the other by six; the total of 11 outputs shown from generator 80.

Function conductors F1 through F5 are shown as a group by reference numeral 81. Also shown as group 82 are function conductor terminating resistors. These may each have a value of 5.6K ohms, and connect the conductors to ground. These are "pull-down" resistors that provide return paths for the currents involved. The function conductors complete the circuit that is manually closed by a passenger to turn on a light, or call for service. This allows coincident A and B clock pulses to actuate the corresponding decoder 9 above that passenger seat.

Chime detector 83 accepts a call pulse from function conductor F4 and converts the pulse to a "chime actuate pulse", interfacing to the aircraft device for giving a chime sound.

Master call driver 84 connects to the master call conductor 85, which connects to all overhead circuits 9. When any one of the overhead calls is active a signal on line 85 enters the master call driver 84, which amplifies it and turns on a lamp or group of lamps at the attendant control panel.

Aircraft are typically provided with seating arranged in "columns" having up to thirty seat groups. Typically, there would be one master call lamp for each such column group. One multi-phase clock generator 80; however, preferably serves all column groups in a given zone of the aircraft.

Further as to FIG. 4, function conductor F4 carries the return unique pulse that is fed from FIG. 3 when any of the "call" switches 27, 27' or 27" are closed by any of the three passengers in this group. This pulse is passed on if there is time coincidence with a pulse from unique clock pulse conductor 25', thereby opening the AND gate comprised of diodes 50 and 51.

This causes the call flip-flop of entity 52 to be set, allowing an output through a transistorized switch to light call lamp 53 in the PSU unit. The flip-flop may be the type CD4001BE, manufactured by RCA, Inc. Having two stable states it keeps the call lamp "On", although the passenger switches are of the momentary contact type.

An additional output from call flip-flop 52 is master call line 54, which duplicates the output that illuminated call lamp 53 and illuminates a similar lamp at the attendant's panel, or at another desired location. This occurs as long as any call lamp is illuminated for the whole matrix of thirty seat groups, and serves to notify the attendant that there is at least one call being made in the group. Diode 55 is for isolation of each PSUD decoder from every other, and is found in each decoder.

Function conductor F5 carries the return unique pulse that is fed from FIG. 3 when any of the "cancel" switches 28, 28' or 28" are closed. This pulse is passed on if there is time coincidence with a pulse from unique clock pulse conductor 25', thereby opening the AND gate comprised of diodes 56 and 57. This causes the call flip-flop of circuit entity 52 to be reset, thus extinguishing call lamp 53.

It is seen that the matrix control and use circuits of this invention are relatively simple, and thus are reliable. The power expenditure is small, a few milliamperes of current at a voltage of 28 volts. Heating is minimal.

If there should be a voltage transient because of an unusual circumstance the diodes involved might experience avalanche breakdown. However, the diodes are self-healing in such a circumstance. Only if a short circuit should occur simultaneously with a transient might a diode be destroyed, and this would be because of high excess current.

The matrix and all of the circuits are immune to spurious radio-frequency interference. This is because of relatively low impedance and definitely a low operating frequency. For a five-phase clock and a 400 Hertz actuating oscillator frequency there will be 80 pulses per second. This is very low with respect to radio frequencies. The general capacitances to ground of the matrix and related circuits will tend to pass radio frequency energy to ground.

Should radio-frequency interference be experienced it is easily bypassed to ground by including capacitors 60 and 61 connected at the output of section controller 5 and related to cables 4c and 6; see FIG. 1. Ceramic capacitors of 0.01 mfd capacitance are suitable for these capacitors.

With respect to reliability, the present matrix is one of wires. The AND gates are simple and are not in the main "chain" that must exist from one seat group to the next. The multiplex art has multifunctioning circuitry between each seat group, and a malfunction there breaks the chain or gives an incorrect result.

Illustrative matrices have been previously disclosed. In general, an X by Y matrix can control the product of X times Y stations, where X and Y are mutually prime. The more nearly "square" the matrix is, the more stations per wire will be obtained.

I claim:

1. The method of controlling a selected use circuit out of a multiplicity of substantially identical sequentially series connected electrical use circuits from a selected control circuit out of the same multiplicity of substantially identical sequentially series connected electrical control circuits that comprises the method steps of;
    (a) forming a one for one correspondence between said use circuits in one sequential series connection and between said control circuits in another sequential series connection,
    (b) providing a first sequence of clock pulses having plural phases to each said electrical use circuit and also to each said electrical control circuit, each with all of the phases displaced one phase from circuit to circuit,
    (c) providing a second sequence of clock pulses having a number of plural phases mutually prime with respect to the number of plural phases of said first sequence of clock pulses, also to each said electrical use circuit and to each said electrical control circuit, each with all of the phases similarly displaced one phase from circuit to circuit,
    (d) successively providing from each said control circuit a unique combination of pulse-coincidences which are carried by a function conductor to the corresponding use circuit, which is simultaneously enabled by correspondingly timed pulses so that actuation of a given said electrical control circuit energizes the corresponding electrical use circuit, and
    (e) cyclically repeating the unique combination of pulse-coincidence at each said control circuit and the corresponding use circuit by continuously providing said first and second sequences of clock pulses.

2. Electrical matrix apparatus for controlling a selected electrical use circuit out of a multiplicity of substantially identical electrical use circuits from a corresponding selected electrical control circuit out of the same multiplicity of substantially identical control circuits, which comprises;
    (a) a continuously pulse-operating first plural-phase clock (A),
    (b) a continuously pulse-operating second plural-phase clock (B), having a number of phases that are different and mutually prime with respect to the number of phases of said first plural-phase clock,
    (c) a multiplicity of electrical use circuits (9), each connected to each phase of both said first and second plural-phase clocks, serially, in a given order, and connected to means to power (45) said multiplicity of electrical use circuits, each said electrical use circuit sequentially series connected to the prior said electrical use circuit one phase different with respect to each phase of said first and second plural-phase clocks,
    (d) a multiplicity of electrical control circuits (8), each also connected to each phase of both said first and second plural-phase clocks, serially, and in the same said given order, and having at least one actuating electrical control element (26), each said electrical control circuit sequentially series connected to the prior said electrical control circuit one phase different with respect to each phase of said first and second plural-phase clocks,
    (e) a function conductor (F1,+) carrying a unique pulse when an electrical control element (26,+) is actuated to the corresponding use circuit, which is simultaneously enabled with correspondingly timed pulses, so that actuation of a given said electrical control circuit (8) energizes the corresponding one electrical use circuit by simultaneity of occurrence of a pulse from said first plural-phase clock and a pulse from said second plural-phase clock.

3. The electrical matrix apparatus of claim 2, in which;
    (a) each electrical use circuit and each electrical control circuit is connected to each phase of both said first (A) and second (B) plural phase clocks through AND gates, to pass an electrical output at said use circuit only when such circuits are receiving a clock pulse from both said plural-phase clocks at the same time.

4. The electrical matrix apparatus of claim 3, which additionally includes at each electrical control circuit;
    (a) means to open and close a circuit (26),
    (b) a unilateral conductor (32) connected thereto, and
    (c) a function conductor (F1) connected thereto and extending through the matrix to corresponding connections elsewhere in the matrix.

5. The electrical matrix apparatus of claim 4, which additionally includes at each electrical control circuit;
    (a) plural means to open and close a circuit (26,26'),
    (b) plural unilateral conductors (32,34) connected thereto, and
    (c) plural function conductors (F1,F2) connected thereto and extending through the matrix to corresponding connections elsewhere in the matrix.

6. The electrical matrix apparatus of claim 3, which additionally includes at each electrical use circuit;
    (a) a function conductor (F1) from the matrix,
    (b) a second AND gate (43,44) connected to said function conductor, and
    (c) a use element (46) connected to said second AND gate for energization when there are simultaneous outputs from said AND gate and said second AND gate.

7. The electrical matrix apparatus of claim 6, which additionally includes at each electrical use circuit;
    (a) plural function conductors (F1,F5)

(b) plural second AND gates (43,44;50,51) individually connected to said plural function conductors, &

(c) plural use elements (46,53) connected to be selectively energized by energization of a said function conductor.

8. The electrical matrix apparatus of claim 2, which additionally includes at each electrical control circuit (8), (a) an electrical input connector (18) having plural terminals, (b) an electrical output connector (20) having plural terminals corresponding to the terminals of said electrical input connector, (c) an individual electrical conductor connected between each plural said terminals, such that the second terminal of the input connector is connected to the first terminal of the output connector, the third terminal of the input connector is connected to the second terminal of the output connector, et seq, to advance the phase of each said first and second plural-phase clocks one phase between each input and output connector, and (d) at least one electrical function conductor (F1) connected between other identical input connector and output connector terminals to communicate a control function from a selected control circuit to the corresponding use circuit.

9. The electrical matrix apparatus of claim 6, in which the electrical use circuit includes a driver circuit 42, comprising;

(a) a capacitor (60), (b) plural diodes (22',23',43,44) connecting said capacitor to said first and second plural-phase clocks (A,B) and to a said function conductor (F1) to charge said capacitor for a limited time when pulses are simultaneously present from the clocks and the function conductor, and (c) transistor means (61) connected to said capacitor for control by the charge upon said capacitor to energize a said use circuit (46).

10. The driver circuit of claim 9, in which;

(a) successive pulses from said first and second plural-phase clocks (A,B) recharge said capacitor (60) sufficiently rapidly to continuously energize said use circuit for as long as said function circuit (F1) is energized.

11. The electrical matrix apparatus of claim 6, in which the electrical use circuit includes a driver circuit (52), comprising;

(a) a first capacitor (64), (b) plural diodes (22',23',50,51,69) connecting said first capacitor to said first and second plural-phase clocks (A,B) and to a fourth function circuit (F4), (c) a second capacitor (66), (d) plural diodes (22',23',56,57,70) connecting said second capacitor to said first and second plural-phase clocks (A,B) and to a fifth function circuit (F5), (e) first and second gates (65,67) connected respectively to said first and second capacitors (64,66) and also cross-connected, to latch a pulse from said fourth function circuit (F4), and to unlatch upon receiving a pulse from said fifth function circuit (F5), and (f) transistor means (68) connected to said first and second gates (65,67), to energize a use circuit (53) when said first capacitor (64) is charged and to deenergize said use circuit (53) when said second capacitor (66) is subsequently charged.

12. The electrical matrix apparatus of claim 6, in which the electrical use circuit includes a driver circuit, comprising;

(a) first diode means (22') connected to said first plural-phase clock (A), (b) second diode means (23') connected to said second plural-phase clock (B), (c) third and sixth diode means (51,57), each connected to said first and second diode means, (d) fourth diode means (50) connected to a fourth said function circuit (F4), (e) fifth diode means (56) connected to a fifth said function circuit (F5), the recited diode means thus connected to give an output only when there is a pulse simultaneously present at each said diode means that selectively include said fourth and said fifth diode means, (f) a first capacitor (64) connected to said fourth diode means (50), (g) a second capacitor (66) connected to said fifth diode means (56), (h) first and second NOR gates (65,67) connected to said first and second capacitors (64,66) and cross-connected to latch a pulse from said fourth diode means (50), and (i) transistor means (68) connected to said NOR gates (65,67) for control by said NOR gates to energize a said use circuit (53), when said first capacitor (64) is charged, and to deenergize said use circuit. (53) when said second capacitor (66) is subsequently charged.

* * * * *